United States Patent Office 2,833,780
Patented May 6, 1958

2,833,780
PRODUCTION OF LYSINE-YIELDING HYDANTOINS AND OF LYSINE THEREFROM

William R. Schmitz, Grand Island, N. Y., assignor to E. I. du Pont de Nemours and Company, Wilmington, Del., a corporation of Delaware No Drawing. Application May 26, 1955
Serial No. 511,421

15 Claims. (Cl. 260—309.5)

This invention relates to the production of lysine-yielding hydantoins and to an improved method for producing lysine employing such hydantoins.

Rogers, U. S. Patent 2,564,649, describes a method for synthesizing lysine involving the amination of 5-(4-chlorobutyl) hydantoin with ammonia to give 5-(4-aminobutyl) hydantoin, which is hydrolyzable to lysine. The patent discloses the use of from 10 to 100 moles of ammonia per mole of the chlorobutyl hydantoin, preferably at temperatures of 30 to 70° C., in carrying out the amination reaction, under which conditions reaction times of 6 to 8 hours are required. Higher temperatures and lower proportions of ammonia are stated to be disadvantageous in that they result in increased formation of undesired by-products. It has now been discovered that advantageous and surprising results are obtained when the chlorobutyl hydantoin is reacted with ammonia at temperatures substantially above 70° C., even when employing less than 10 moles of ammonia per mole of the chlorobutyl hydantoin. It has also been found that when the reaction is effected under the conditions described below, reaction is complete in a few minutes and that a mixture of hydantoins is obtained which can be readily hydrolyzed to give lysine in high yields.

It is, accordingly, an object of the invention to provide a method for producing a mixture of lysine-yielding hydantoins by reacting 5-(4-chlorobutyl) hydantoin (or the corresponding bromo compound) with ammonia. A further object is to provide an improved method for producing lysine involving the hydrolysis of such lysine-yielding hydantoins. Further objects will be apparent from the following description.

The objects of the invention are accomplished by reacting 5-(4-chlorobutyl) hydantoin or 5-(4-bromobutyl) hydantoin with ammonia at a temperature of at least 100° C. It has been found, unexpectedly, that at such high temperatures, the reaction is complete in a matter of minutes to give a mixture of hydantoins which yield lysine upon hydrolysis. It has been found further that wasteful by-products are not formed to an excessive extent at such high temperatures, even when employing relatively low mole ratios of ammonia to halobutyl hydantoin, so that good yields of lysine can be obtained by hydrolyzing the mixture of hydantoin products.

The chlorobutyl hydantoin dissolves readily in ammonia at room temperature to form what is probably the ammonium salt, (I):

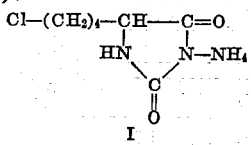

I

At temperatures of 100° C. and higher, a mixture of hydantoins is produced including the following:

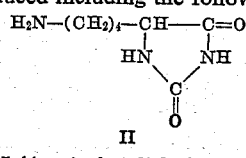

II
5-(4-aminobutyl) hydantoin

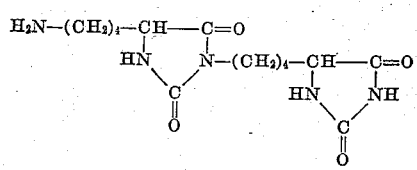

III

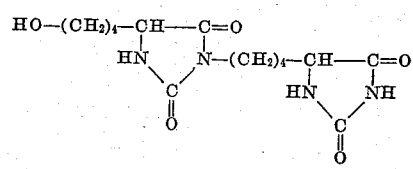

IV

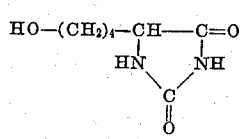

V
5-(4-hydroxybutyl) hydantoin

Evidence for the above products was obtained from an experiment in which 9.5 g. (50 millimoles) of the chlorobutyl hydantoin and 27.0 ml. (400 millimoles) of 28% aqueous ammonia were reacted in the presence of 19.2 g. (200 millimoles) of ammonium carbonate during 5 minutes at 135° C. The reaction mixture, after evaporating excess ammonia, was passed through a column of a sulfonic acid type cation exchange resin in its ammonium form. This permitted compounds II and III to be held on the resin and compounds IV and V to pass through. Compounds II and III were then eluted from the resin with aqueous ammonia. After ammonia had been distilled from the effluent containing II and III, titration of the residue to pH 5.15 (the hydrochloride stage) required 22.95 millimoles of 1.0 N HCl. Acid hydrolysis of II and III, however, gave 27.70 millimoles of lysine, or 4.75 millimoles more than possible if only II had been present. Therefore, 4.75×2 or 9.5 millimoles of lysine must have been obtained from III, and 4.75 millimoles of III and 18.2 millimoles of II were originally present. Thus, compounds II and III, respectively, accounted for 18.2 and 9.5 millimoles of the chlorobutyl hydantoin used.

Acid hydrolysis of the fraction containing compounds IV and V gave 4.3 millimoles of lysine. This indicated the original presence of 4.3 millimoles of compound IV, equivalent to 8.6 millimoles of chlorobutyl hydantoin.

The above data account for 36.3 millimoles of the chlorobutyl hydantoin used. Assuming the balance of 13.7 millimoles to be accountable as compound V, the composition of the mixture of reaction products would be:

| | Percent by wt. |
|---|---|
| Compound II | 37.1 |
| Compound III | 18.5 |
| Compound IV | 16.7 |
| Compound V | 27.7 |
| | 100.0 |

It is obvious from the formulas that on hydrolysis each mole of compounds II, III and IV would yield one, two and one moles of lysine, respectively, and that compound V would yield no lysine. Formation of compound II is highly desirable since it reduces formation of undesired secondary and tertiary amino compounds and also reduces formation of ammonium chloride during hydrochloric acid hydrolysis of the hydantoin mixture to lysine. Presence of ammonium chloride is undesirable when cation exchange methods are employed in isolating the final lysine product.

Reducing the amount of ammonia used in the reaction with chlorobutyl hydantoin and eliminating ammonium carbonate from the reaction mixture favors to some extent the formation of compound III over compound II. Thus, in two identical experiments in which the mole ratio of ammonia to chlorobutyl hydantoin was only 4:1 and no ammonium carbonate was present, one experiment gave 33.5 millimoles of lysine when the resulting mixture of hydantoins was hydrolyzed. It was established by the parallel experiment that only 17.5 millimoles of compounds II and III were present in the mixture. These results show that considerably more of compound III was formed than was compound II.

The ammonia reactant may be either aqueous or anhydrous. The mole ratio of ammonia to halobutyl hydantoin may be as low as 1:1 but generally will range from 4 to 20:1 (a preferred range being 4 to 8:1). Larger proportions of ammonia can be used. Of particular interest is the fact that good results in terms of high yields of lysine can be obtained by the present method, even though the ratio of ammonia to halobutyl hydantoin is considerably below the minimum considered heretofore to be practical. Furthermore, the reaction with ammonia is complete in a few minutes.

It is desirable to have present in the reaction mixture from about 0.1 to 4 moles of ammonium carbonate per mole of halobutyl hydantoin, even though such carbonate may tend to reduce somewhat formation of the compound of Formula III. This is because of the beneficial effect of such carbonate in inhibiting excessive formation of undesired secondary and tertiary amino by-products. Preferably, 0.5 to 1.5 moles of the carbonate, along with 4 to 8 moles of ammonia will be employed per mole of halobutyl hydantoin.

The reaction will be carried out at temperatures from 100° C. to about 175° C., or higher. Those from 100 to 150° C. are preferred since at higher temperatures the yield of lysine is poorer, probably due to increased formation of undesired secondary and tertiary amino compounds. It has been found that the reaction with ammonia is complete in about 10 minutes at 100° C. and in about 5 minutes at 135° C. Continuance of heating after completion of the reaction does not appear to be especially harmful, but neither is it beneficial. Ordinarily, the total time at the reaction temperature will not exceed about 30 minutes. Completion of reaction is indicated when analyses show that all organic chlorine has been converted to chloride ion.

The invention is illustrated by the following examples in which all parts and percentages are by weight and the notation "CBH" stands for 5-(4-chlorobutyl) hydantoin. All product yields are based on the CBH used.

EXAMPLE 1

A stainless steel autoclave provided with a stirrer was charged with 143 parts of CBH, M. P. 127.5–129.5° C., 370 parts of 28% aqueous ammonia and 72 parts of ammonium carbonate, corresponding to mole proportions of 1:8:1. The mixture was stirred and heated to 100° C. during 20 minutes and stirring was continued for another 10 minutes at that temperature. After cooling to room temperature then distilling off excess ammonia and carbon dioxide, an aliquot corresponding to 1/15 of the chlorobutyl hydantoin used was hydrolyzed with 29.7 parts of 37% hydrochloric acid to give 6.8 parts of DL-lysine·HCl (74.5% yield).

EXAMPLE 2

A mixture of 9.5 g. (0.05 mole) CBH, M. P. 129° C., 7.5 g. (0.05 mole) ammonium carbonate and 27 ml. (0.4 mole) 28% aqueous ammonia was heated for 1 hour at 100° C. in a sealed carius tube. The mixture was then boiled at atmospheric pressure to remove excess ammonia and the residual mixture was hydrolyzed with 30 ml. of 37% hydrochloric in a sealed carius tube during 4 hours at 180° C. The yield of DL-lysine·HCl was 82.2%. The chlorine content of the product was 19.4% (theory=19.45%).

EXAMPLE 3

Following is a tabulation of the results obtained in a number of experiments in which mixtures of CBH, M. P. 115–119° C., 28% aqueous ammonia and ammonium carbonate in various proportions were reacted in sealed carius tubes at 100° C. or 135° C., following which the contents of the tubes were evaporated to dryness then hydrolyzed with 37% hydrochloric acid.

*Table 1*

| Molar Ratio of CBH:NH$_3$:(NH$_4$)$_2$CO$_3$ | Reaction Conditions | | Percent Yield DL-Lysine·HCl |
|---|---|---|---|
| | Temp. (°C.) | Time (min.) | |
| 1:4:0 | 100 | 10 | 54.1 |
| 1:4:1 | 135 | 5 | 58.0 |
| 1:6:1 | 135 | 5 | 59.5 |
| 1:8:1 | 100 | 10 | 59.5 |
| 1:8:1 | 135 | 5 | 60.8 |
| 1:8:1 | 135 | 5 | 60.8 |
| 1:8:2 | 135 | 5 | 61.5 |
| 1:12:1 | 135 | 5 | 59.5 |
| 1:12:4 | 135 | 5 | 61.9 |
| 1:16:4 | 100 | 15 | 64.3 |
| 1:20:4 [1] | | | |

[1] Aliquot of mixture from run conducted in a 4-gallon reactor.

EXAMPLE 4

The results shown in Table 2 demonstrate that the reaction of CBH with ammonia is extremely rapid at temperatures of 100° C. or higher. These data were obtained by reacting CBH (M. P. 127–129° C.) and 28% aqueous ammonia at a molar ratio of 1:4 in sealed Carius tubes placed by remote control into an oil bath maintained at the desired temperature. Each tube, after being held in the oil bath for the exact number of minutes indicated, was removed and quenched immediately in a water bath and then in a solid carbon dioxide-trichloroethylene bath. The contents of each tube was analyzed for chloride ion by the Volhard method to determine completeness of the reaction and the remainder was then evaporated to dryness. The residue was hydrolyzed with concentrated hydrochloric acid to lysine which was isolated as DL-lysine·HCl by the pyridine precipitation method of Eck and Marvel (Org. Syn. 19, 61 (1939)).

*Table 2*

| Temp. (°C.) | Time (Min.) | Percent Reacted | Percent Yield DL-Lysine·HCl |
|---|---|---|---|
| 100 | 5 | 60 | 34.6 |
| 100 | 10 | 100 | [1] 54.1 |
| 120 | 3 | 76 | 42.2 |
| 120 | 10 | 100 | 63.4 |
| 135 | 5 | 100 | 68.3 |

[1] Using CBH melting at 115–119° C.

EXAMPLE 5

A Carius tube charged with 9.5 g. of CBH (M. P. 127–129° C.) and about 10 ml. anhydrous liquid ammonia was heated at 120° C. for 20 minutes, following which the mixture was evaporated and the residue hydrolyzed as generally indicated above. There was isolated 6.63 g. (73% yield) of DL-lysine·HCl.

The purity of the chlorobutyl hydantoin has a direct effect upon the yield of lysine, practically a straight line relationship existing between the melting point of the chlorobutyl hydantoin and the yield of lysine. Highest yields are, of course, obtained with pure chlorobutyl hydantoin, M. P. 130–132° C.

The above examples illustrate the use of chlorobutyl hydantoin. 5-(4-bromobutyl) hydantoin can be similarly used to obtain similar results. Use of the chloro compound is preferred for economic reasons.

Hydrolysis to lysine of the mixture of lysine-yielding hydantoins resulting from the reaction of the halobutyl hydantoin with ammonia can be readily effected with aqueous solutions of acids or bases. Acids such as hydrochloric acid, hydrobromic acid and sulfuric acid and bases such as the alkali and alkaline earth metal hydroxides are particularly suitable. An excess, e. g., 10–100% or more, of the acid or base will generally be used at temperatures of 80 to 300° C. In general, the conditions described in Patent 2,564,649 as applicable to the hydrolysis of 5-(4-aminobutyl) hydantoin are also applicable to the hydrolysis of the present mixture of lysine-yielding hydantoins.

The present method for reacting the halobutyl hydantoin with ammonia is highly advantageous over prior methods in that the reaction is complete in a matter of minutes instead of hours. Such short reaction time makes the method outstandingly suitable for continuous operation by any of the well-known procedures for effecting chemical reactions continuously with resultant well-known economic advantages. Another characteristic of the present method is that good yields of lysine can be obtained when employing less ammonia and ammonium carbonate than considered practical, even in prior methods.

I claim:

1. The method comprising reacting a halobutyl hydantoin from the group consisting of 5-(4-chlorobutyl) hydantoin and 5-(4-bromobutyl) hydantoin with ammonia, employing not in excess of 20 moles of ammonia per mole of said halobutyl hydantoin, at a temperature of at least 100° C. and for a time not exceeding 30 minutes to obtain a mixture of lysine-yielding hydantoins substantially free of said halobutyl hydantoin, and hydrolyzing said mixture to lysine.

2. The method of claim 1 wherein the reaction with ammonia is effected at a temperature of 100 to 175° C. employing from 1 to 20 moles of ammonia per mole of said halobutyl hydantoin.

3. The method of claim 2 employing 1 to 8 moles of ammonia per mole of said halobutyl hydantoin.

4. The method of claim 2 wherein the reaction with ammonia is effected at 100 to 150° C. in the presence of from 0.1 to 4 moles of ammonium carbonate per mole of said halobutyl hydantoin.

5. The method of claim 4 wherein 4 to 8 moles of ammonia and 0.5 to 1.5 moles of ammonium carbonate are employed per mole of said halobutyl hydantoin.

6. The method of obtaining a mixture of lysine-yielding hydantoins comprising reacting a halobutyl hydantoin of the group consisting of 5-(4-chlorobutyl) hydantoin and 5-(4-bromobutyl) hydantoin with ammonia, employing not in excess of 20 moles of ammonia per mole of said halobutyl hydantoin, at a temperature of at least 100° C. and for a time not exceeding 30 minutes to obtain a mixture of hydantoins substantially free of said halobutyl hydantoin.

7. The method of obtaining a mixture of lysine-yielding hydantoins comprising reacting a halobutyl hydantoin of the group consisting of 5-(4-chlorobutyl) hydantoin and 5-(4-bromobutyl) hydantoin with ammonia, employing not in excess of 20 moles of ammonia per mole of said halobutyl hydantoin, at a temperature of 100 to 175° C. and for a time not exceeding 30 minutes to obtain a mixture of hydantoins substantially free of said halobutyl hydantoin.

8. The method of claim 7 wherein from 1 to 20 moles of ammonia are employed per mole of said halobutyl hydantoin and the reaction temperature is in the range 100–150° C.

9. The method of claim 7 wherein from 4 to 8 moles of ammonia are employed per mole of said halobutyl hydantoin.

10. The method of claim 8 wherein the reaction is carried out in the presence of from 0.1 to 4 moles of ammonium carbonate per mole of said halobutyl hydantoin.

11. The method of claim 9 wherein the reaction is effected in the presence of from 0.5 to 1.5 moles of ammonium carbonate per mole of said halobutyl hydantoin.

12. An aqueous solution of hydantoins, said hydantoins consisting essentially of the hydantoins having the formulas:

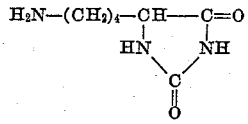

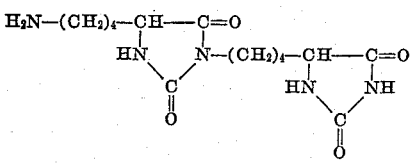

13. An aqueous solution of hydantoins, said hydantoins consisting essentially of the hydantoins having the formulas:

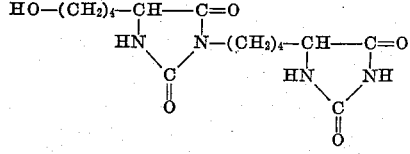

and

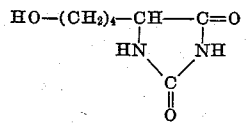

14. A composition comprising an aqueous solution of hydantoins, said hydantoins consisting essentially of the hydantoins having the following formulas:

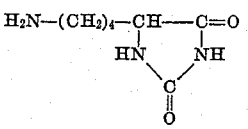

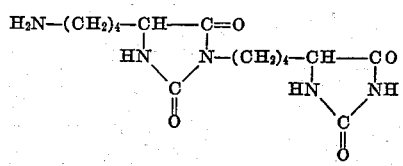

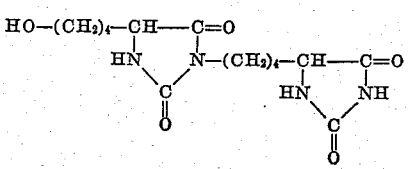

and
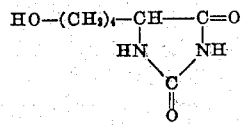
15. The method of producing lysine comprising hydrolyzing a mixture consisting essentially of the hydantoins whose formulas are given in claim 14.
References Cited in the file of this patent
UNITED STATES PATENTS
| | | |
|---|---|---|
| 2,498,300 | Scott et al. | Feb. 21, 1950 |
| 2,564,648 | Rogers | Aug. 14, 1951 |
| 2,564,649 | Rogers | Aug. 14, 1951 |
| 2,603,651 | Gaudry | July 15, 1952 |
| 2,626,263 | Gaudry | Jan. 20, 1953 |

U. S. DEPARTMENT OF COMMERCE
PATENT OFFICE

CERTIFICATE OF CORRECTION

Patent No. 2,833,780     William R. Schmitz     May 6, 1958

It is hereby certified that error appears in the printed specification of the above numbered patent requiring correction and that the said Letters Patent should read as corrected below.

Column 2, line 69, for "compound II" read -- compound III ---; column 5, line 12, for "hydantonins" read -- hydantoins --; column 6, line 25, claim 12, between the first formula and the second formula therein, insert the word -- and --; same column, claim 14, following the first and second formula therein, insert a comma in each occurrence.

Signed and sealed this 24th day of June 1958.

(SEAL)
Attest:
KARL H. AXLINE

Attesting Officer

ROBERT C. WATSON
Commissioner of Patents